(12) United States Patent
Adachi

(10) Patent No.: US 7,295,344 B2
(45) Date of Patent: Nov. 13, 2007

(54) IMAGE PROCESSING METHOD AND IMAGE PROCESSING APPARATUS, PROGRAM AND RECORDING MEDIUM, AND IMAGE FORMING APPARATUS

(75) Inventor: Yasushi Adachi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 986 days.

(21) Appl. No.: 10/673,109

(22) Filed: Sep. 25, 2003

(65) Prior Publication Data

US 2004/0105108 A1 Jun. 3, 2004

(30) Foreign Application Priority Data

Sep. 25, 2002 (JP) ............... P2002-279941

(51) Int. Cl.
*H04N 1/38* (2006.01)
*H04N 1/387* (2006.01)
*G06K 9/46* (2006.01)
*G06T 7/00* (2006.01)

(52) U.S. Cl. .............. 358/1.9; 358/3.24; 358/453; 382/194; 382/282

(58) Field of Classification Search .......... 358/1.9, 358/3.24, 3.27, 530, 538, 448, 453, 464; 382/190, 194, 245, 282
See application file for complete search history.

(56) References Cited

U.S. PATENT DOCUMENTS 5,048,096 A * 9/1991 Beato ............... 382/176

5,701,364 A * 12/1997 Kanno ............... 358/1.9
5,742,400 A * 4/1998 Satoh ............... 382/262
5,867,634 A * 2/1999 Hirota et al. ............... 358/1.9
6,654,495 B1 * 11/2003 Katoh et al. ............... 382/178
7,158,261 B2 * 1/2007 Kurose ............... 358/2.1

OTHER PUBLICATIONS

Mitsuo Kaji; "*Print Image Engineering For Print and Electric Engineers*"; First Edition; Insatsugakkai Shuppanbu; Jun. 15, 1988; pp. 269-278; with partial English language translation of marked portion of p. 272.

* cited by examiner

*Primary Examiner*—Scott A. Rogers
(74) *Attorney, Agent, or Firm*—David G. Conlin; David A. Tucker; Edwards Angell Palmer & Dodge LLP

(57) ABSTRACT

A parameter representing whether an effective density pixel exists in an objective image is calculated. As to each interest pixel in the objective image having one pixel neighboring a downstream side in a first direction, the interest pixel is defined as an effective density pixel when a first condition and a second condition is an effective density pixel are satisfied, and in other case, the interest pixel is defined as an ineffective density pixel. The objective image is converted to an update image on one-line reduced lines in the first direction. A parameter representing whether an effective density pixel exists in the update image is calculated. The conversion and the calculation are repeated about the update image as the objective image. When the objective image converts one line in the first direction, the number of continuous pixels of the effective density pixels spatially continuing is calculated based on each parameter.

10 Claims, 10 Drawing Sheets

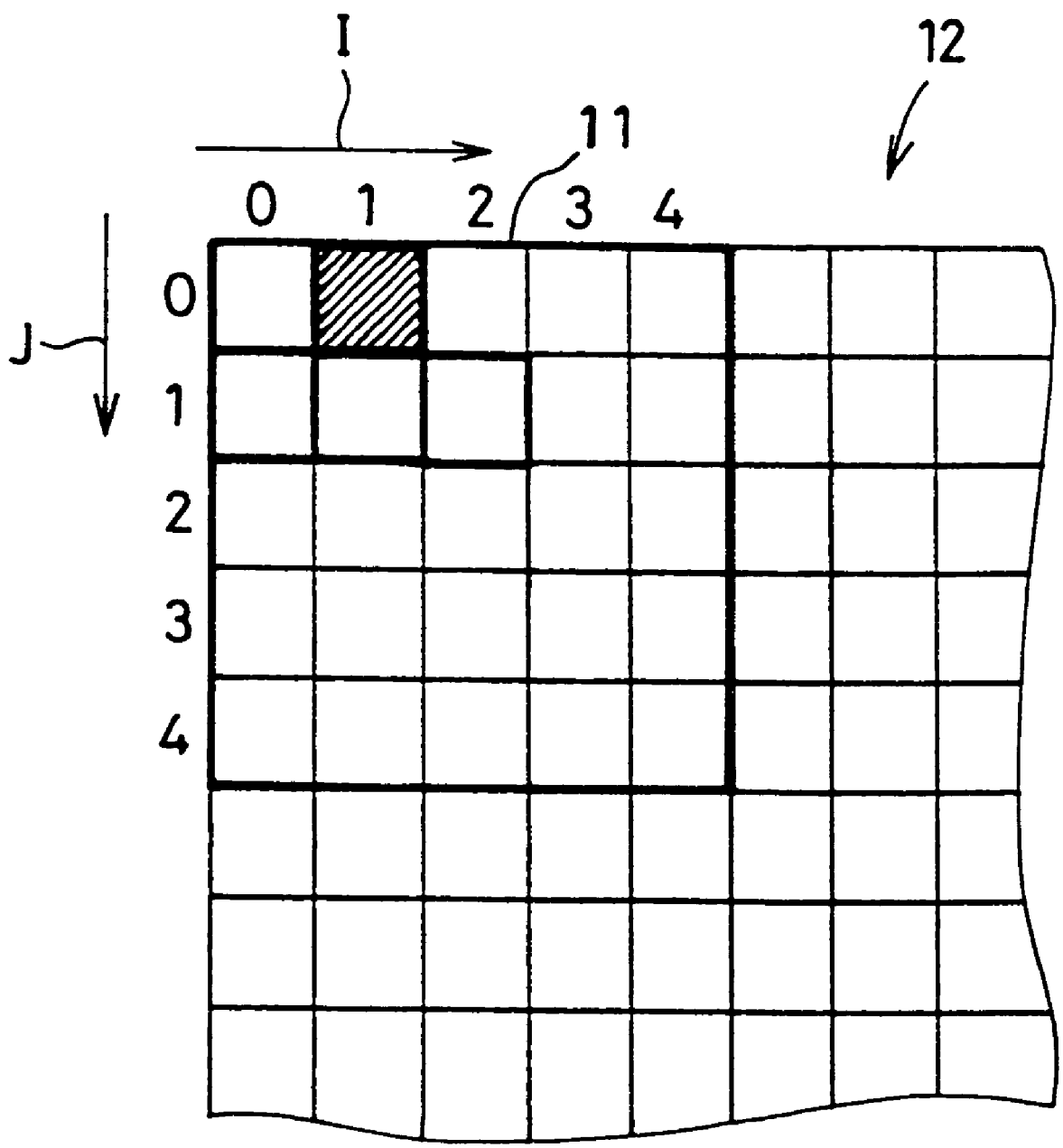

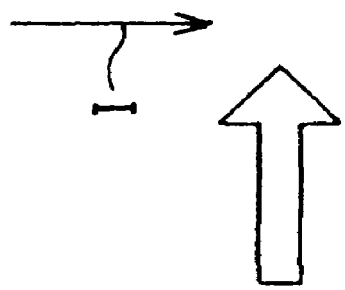
FIG. 4B
FIG. 4A

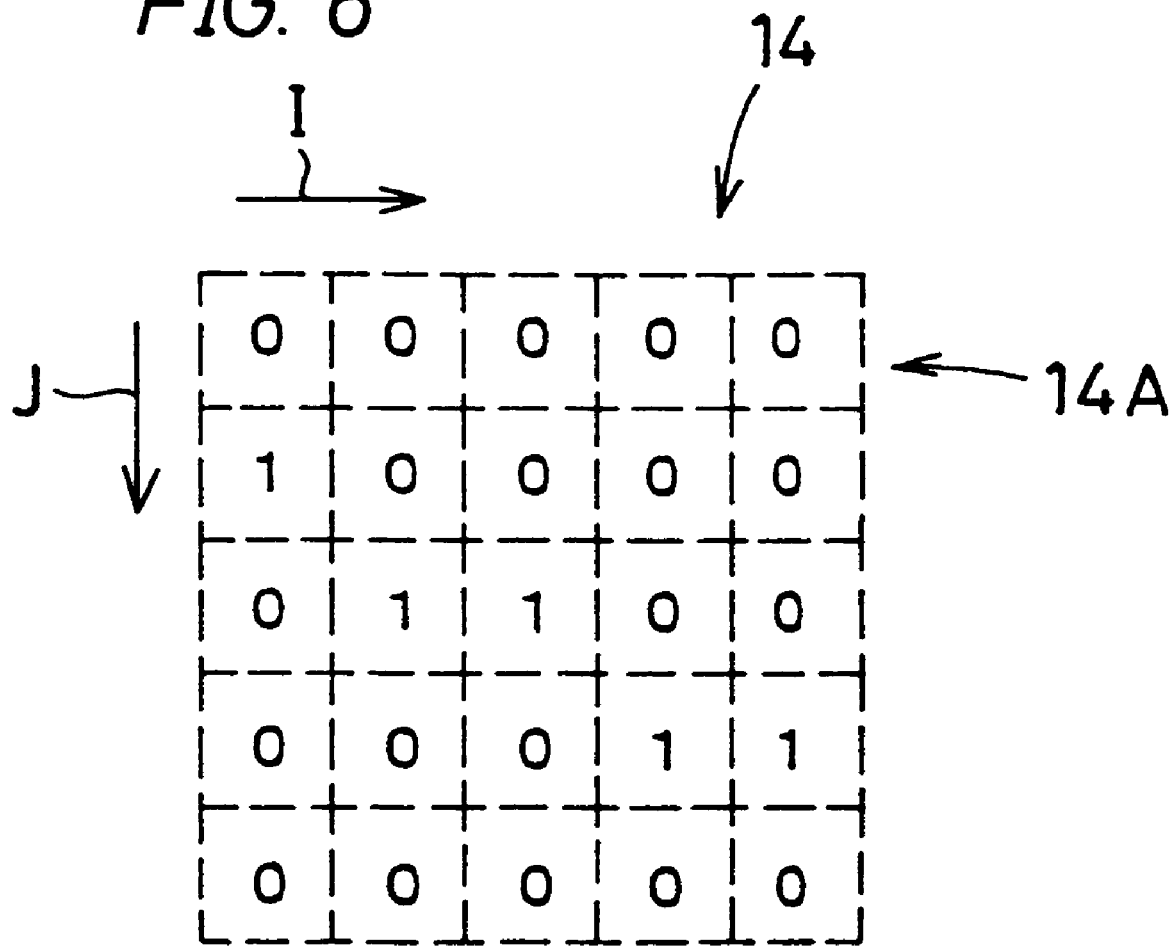

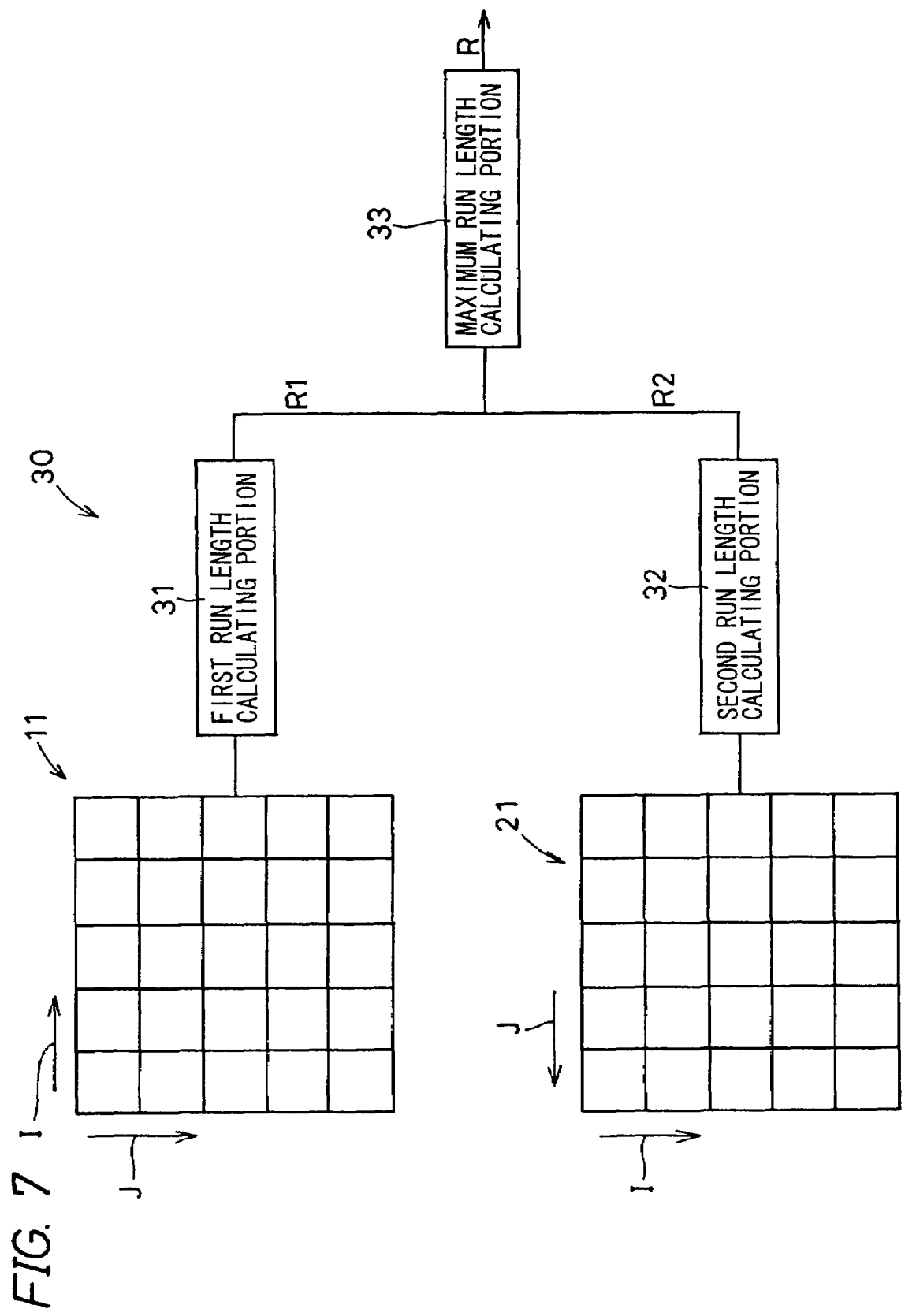

IMAGE PROCESSING METHOD AND IMAGE PROCESSING APPARATUS, PROGRAM AND RECORDING MEDIUM, AND IMAGE FORMING APPARATUS

BACKGROUND OF THE INVENTION

1. Field of the Invention

The present invention relates to an image processing method for calculating run length to be applied as characteristic quantity for identifying a pixel in each area in an image, a program for making a computer run the image processing method and a recording medium recording the program, and an image processing apparatus calculating the run length and an image forming apparatus provided with the image processing apparatus.

2. Description of the Related Art

Image forming apparatuses such as a digital copying apparatus and a facsimile apparatus or the like apply image processing to read image data of an input image for improving quality of the image formed on a recording sheet. As this image processing, there is a method by which run length is calculated and image processing is performed with use of the run length (for instance, see Mitsuo Kaji, "Print Image Engineering For Print and Electric Engineers", First Edition, Insatsugakkai Shuppanbu, Jun. 15, 1988, p 269-278).

FIG. 10 is a view showing a pixel block 2 from which run length is calculated as an example. FIG. 11 is a view showing a direction in which the run length is traced on the basis of definition of the run length for the pixel block 2 shown in FIG. 10. To calculate the run length, first an input image 1 is divided into the pixel block 2 consisting of a plurality of pixels as shown in FIG. 10 and each pixel of the pixel block 2 is classified by a density value of the pixel. Next a pixel with a certain density value is defined as an interest pixel and a pixel which has the same density value as the interest pixel and is spatially continuing with the interest pixel, is traced. Thus, a number of pixels spatially continuing with the interest pixel is calculated as run length.

Tracing pixels being spatially continuing is made in eight directions which are directed from the interest pixel to each peripheral pixel as shown by arrow marks in FIG. 11. Peripheral pixels having the same density value as the interest pixel 6 are traced in each of the eight directions and moreover the traced peripheral pixel is defined as a new interest pixel and a peripheral pixel having the same density value as the new interest pixel is traced in each of the eight directions. A pixel tracing route drawn from the first interest pixel defined as a starting point becomes a straight line or a curved line as shown in FIG. 10.

According to image processing method as shown in FIGS. 10 and 11, since eight tracing directions is always assumed as shown in FIG. 11, a number of patterns of pixel tracing route in the pixel block 2 becomes enormous number. In addition, since the peripheral pixel 7 having the same density as the interest pixel 6 is not limited to only one, there is possibility that the tracing route will diverge on the way and the tracing route will become complicated.

Thus, in a method of calculating run length, the scale of a circuit for calculating the run length becomes large and therefore there is a problem that the circuit cannot be realized as hardware. This is because the circuit corresponding to the assumed pixel tracing route should be provided for calculating the run length and the scale of the circuit is proportion to the number of patterns of the tracing route.

Therefore, when a vast tracing route is assumed, the scale of the circuit becomes large and it is impossible that the circuit is realized as hardware.

In addition, since the scale and processing amount of software for calculating the run length becomes vast, the speed of processing becomes very low. Consequently, since processing corresponding to the assumed pixel tracing route should be provided for calculating the run length and the scale of the processing is proportion to the number of patterns of the tracing route, the scale of the processing becomes large and the processing requires much time when the vast tracing route is assumed.

SUMMARY OF THE INVENTION

Consequently, an object of the invention is to provide an image processing method and the image processing apparatus, the program and the recording medium, and the image forming apparatus by which run length can be easily calculated and the scale of the circuit can be reduced and the circuit can be realized as hardware.

The invention provides an image processing method comprising:

a first process for, when a block image consisting of a plurality of pixels is defined as an objective image, calculating a parameter representing whether an effective density pixel having a predetermined density value exists in the objective image;

a second process for, when one of pixels in the objective image is defined as an interest pixel and a pixel neighboring downstream side in a predetermined first direction with respect to the interest pixel is defined as a neighboring pixel, converting the objective image to an update image on lines from which one line is reduced in the first direction, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image;

a third processing for calculating a parameter representing whether an effective density pixel exists in the update image; and a fourth processing for, when the second and third processes are repeated with respect to the update image defined as the objective image after the third process so that the objective image is lined on one line in the first direction, calculating a number of continuous pixels of the effective density pixels being spatially continuing in the block image on the basis of each parameter calculated in the first and the third processes.

According to the invention, in the first process, a block image consisting of a plurality of pixels is defined as an objective image and a parameter representing whether an effective density pixel exists in the objective image is calculated. In the second process, when one of pixels in the objective image is defined as an interest pixel and a pixel neighboring downstream side in a predetermined first direction with respect to the interest pixel is defined as a neighboring pixel, the objective image is converted to an update image on lines from which one line is reduced in the first direction, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image.

In the third process, a parameter representing whether an effective density pixel exists in the update image is calculated. In the fourth process, when the second and third processes are repeated with respect to the update image defined as the objective image after the third process so that the objective image is lined on one line in the first direction, a number of continuous pixels of the effective density pixels being spatially continuing in the block image is calculated on the basis of each parameter calculated in the first and the third processes. Since complexity of processing for calculating the number of continuous pixels and complexity of a circuit performing the processing are proportion to the number of pixels included in the block image which becomes the objective image, the processing and configuration of the circuit performing the processing can be easily adjusted by adjusting the number of pixels included in the block image.

In a conventional method of calculating the number of continuous pixels, the number of continuous pixels is calculated by checking density values of the all pixels neighboring the interest pixel in the objective image as the center and repeating a process in which a pixel whose density value is the same as the interest pixel is defined as a new interest pixel. However, in such a method, since the number of pixels neighboring the interest pixel is large, the number of routes tracing the interest pixel becomes vast and a processing of calculating the number of continuous pixels becomes extremely complicated. On the other hand, in the invention, since processing of the invention focuses attention on only the pixel neighboring the downstream side in the first direction with respect to the interest pixel among the all pixels neighboring the interest pixel and the processing is performed on the basis of the first condition and the second condition, the processing for calculating the number of continuous pixels becomes quite simpler than the conventional method. In addition, since the objective image becomes smaller whenever the second and the third processes are repeated, the processing for calculating the number of continuous pixels becomes simpler. Consequently, the image processing method of the invention can perform the processing for calculating the number of continuous pixels extremely easily and at a high speed and can also simplify configuration of the circuit for performing the calculating processing.

In addition, in the invention, it is preferable that the number of continuous pixels is calculated in the fourth process by adding each parameter calculated in the first and the third processes.

According to the invention, the number of continuous pixels is calculated in the fourth process by adding each parameter calculated in the first and the third processes. Since the number of continuous pixels is calculated by such a simple operation, the processing for calculating the number of continuous pixels can be performed at a very high speed.

In addition, in the invention, it is preferable that the number of continuous pixels is calculated in the fourth process by looking up a table showing relation between each parameter and the number of continuous pixels.

According to the invention, the number of continuous pixels is calculated in the fourth process by looking up the table showing relation between each parameter and the number of continuous pixels. Since the processing for calculating the number of continuous pixels is performed by only looking up the table without performing various operations, the processing for calculating the number of continuous pixels can be performed at an extremely high speed.

In addition, in the invention, it is preferable that an image processing method further comprises a fifth process for, when one of pixels in the objective image is defined as an interest pixel and a pixel neighboring downstream side in a second direction different from the first direction with the interest pixel is defined as a neighboring pixel, converting the objective image to an update image on lines from which one line is reduced in the second direction, by defining the interest pixel as the effective density pixel when a third condition on which the interest pixel is an effective density pixel and a fourth condition on which at least one neighboring pixel with respect to the interest pixel is an effective density pixel are satisfied, and by defining the interest pixel as an ineffective density pixel when either the third condition or the fourth condition is satisfied, as to each interest pixel having at least one neighboring pixel in the objective image;

a sixth process for calculating a parameter representing whether an effective density pixel exists in the update image;

a seventh process for, when the fifth and the sixth processes are repeated with respect to the update image defined as the objective image after the sixth process so that the objective image is lined on one line in the second direction, calculating the number of continuous pixels in the block image on the basis of each parameter calculated in the fifth and the sixth processes; and an eighth process for comparing the number of continuous pixels calculated in the fourth process with the number of continuous pixels calculated in the seventh process and calculating the number of continuous pixels having a larger value of them as the number of continuous pixels in the block image.

According to the invention, in the fifth process, when one of pixels in the objective image is defined as an interest pixel and a pixel neighboring downstream side in a second direction different from the first direction with the interest pixel is defined as a neighboring pixel, the objective image is converted to an update image on lines from which one line is reduced in the second direction, by defining the interest pixel as the effective density pixel when a third condition on which the interest pixel is an effective density pixel and a fourth condition on which at least one neighboring pixel with respect to the interest pixel is an effective density pixel are satisfied, and by defining the interest pixel as an ineffective density pixel when either the third condition or the fourth condition is satisfied, as to each interest pixel having at least one neighboring pixel in the objective image. In the sixth process, a parameter representing whether an effective density pixel exists in the update image is calculated. In the seventh process, when the fifth and the sixth processes are repeated with respect to the update image defined as the objective image after the sixth process so that the objective image is lined on one line in the second direction, the number of continuous pixels in the block image is calculated on the basis of each parameter calculated in the fifth and the sixth processes. In the eighth process, the number of continuous pixels calculated in the fourth process is compared with the number of continuous pixels calculated in the seventh process, and the number of continuous pixels having a larger value of them is calculated as the number of continuous pixels in the block image. Thus, since the number of continuous pixels is calculated not only in the first direction but also in the second direction and the number of continuous pixels is calculated on the basis of these continuous pixels in both directions, the number of continuous pixels can be accurately calculated.

In addition, in the invention, it is preferable that the number of continuous pixels is calculated in the seventh process by adding each parameter calculated in the fifth and the sixth processes.

According to the invention, the number of continuous pixels is calculated in the seventh process by adding each parameter calculated in the fifth and the sixth processes. Since the number of continuous pixels is calculated by such a simple operation, the processing for calculating the number of continuous pixels can be performed at a very high speed.

In addition, in the invention, it is preferable that the number of continuous pixels is calculated in the seventh process by looking up a table showing relation between each parameter and the number of continuous pixels.

According to the invention, the number of continuous pixels is calculated in the seventh process by referring to the table showing relation between each parameter and the number of continuous pixels. Since the processing for calculating the number of continuous pixels is performed by only looking up the table without performing various operations, the processing for calculating the number of continuous pixels can be performed at an extremely high speed.

In addition, the invention provides a program for making the computer run the image processing method.

According to the invention, the computer is operated in accordance with the above-mentioned image processing by the computer's running the program and the above-mentioned action can be achieved.

In addition, the invention provides a computer-readable recording medium on which the above-mentioned program is recorded.

According to the invention, the above-mentioned image processing method can be performed by running the program which is read by the computer and is recorded. In addition, the programs can be easily supplied to a plurality of computers via the recording medium.

In addition, the invention provides an image processing apparatus comprising:

a parameter calculating section for calculating a predetermined parameter representing whether an effective density pixel having a predetermined density value exists in an objective image which is a block image consisting of a plurality of pixels;

an image converting section for performing image conversing processing for converting the objective image to an update image on lines from which one line is reduced in the detecting direction, when one of pixels in the objective image is defined as an interest pixel and a pixel neighboring downstream side in a predetermined first direction with respect to the interest pixel is defined as a neighboring pixel, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image, and for repeating the image converting processing until an objective image is lined on one line in the detecting direction after the update image is defined as the objective image again whenever the image converting processing is terminated; and a continuous-pixel-number calculating section for calculating the number of continuous pixels which represents the number of effective density pixel being spatially continuing in the block image on the basis of the parameter calculated by the parameter calculating section.

According to the invention, by the parameter calculating section, a parameter representing whether an effective density pixel having the predetermined density value exists in an objective image which is a block image consisting of a plurality of pixels, is calculated. By the image converting section, image conversing processing for converting the objective image to an update image on lines from which one line is reduced in the detecting direction is performed, when one of pixels in the objective image is defined as an interest pixel and a pixel neighboring downstream side in a predetermined first direction with respect to the interest pixel is defined as a neighboring pixel, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image, and the image converting processing is repeated until an objective image is lined on one line in the detecting direction after the update image is defined as the objective image again whenever the image converting processing is terminated.

The number of continuous pixels is calculated by the continuous-pixel-number calculating section on the basis of the parameter calculated by the parameter calculating section. Since complexity of processing for calculating the number of continuous pixels and complexity of a circuit performing the processing are proportion to the number of pixels included in the block image which becomes the objective image, the processing and configuration of the circuit for performing the processing can be easily adjusted by adjusting the number of pixels included in the block image.

In a method of calculating the number of continuous pixels in a conventional image processing apparatus, the number of continuous pixels is calculated by checking density values of the all pixels neighboring the interest pixel in the objective image as the center and repeating a process in which a pixel whose density value is the same as the interest pixel is defined as a new interest pixel. However, in such a method, since the number of pixels neighboring the interest pixel is large, the number of routes tracing the interest pixel becomes vast and a processing of calculating the number of continuous pixels becomes extremely complicated. On the other hand, in the invention, since processing of the invention focuses attention on only the pixel neighboring the downstream side in the detecting direction with respect to the interest pixel among the all pixels neighboring the interest pixel and the processing is performed on the basis of the first condition and the second condition, the processing for calculating the number of continuous pixels becomes quite simpler than the conventional method. In addition, since the objective image becomes smaller whenever the image converting processing is repeated, the processing for calculating the number of continuous pixels becomes simpler. Consequently, in the image processing apparatus of the invention, the processing for calculating the number of continuous pixels is performed at an extremely high speed and can also simplify configuration of the circuit for performing the calculating processing.

In addition, the invention provides an image forming apparatus provided with the image processing apparatus.

According to the invention, since the above-mentioned operation can be achieved, it is possible to realize an image forming apparatus which can output a high quality image.

BRIEF DESCRIPTION OF THE DRAWINGS

Other and further objects, features, and advantages of the invention will be more explicit from the following detailed description taken with reference to the drawings wherein:

FIG. 2 is a view showing a block image;

FIG. 4A is a view showing the first image;

FIG. 4B is a view showing the first rotated image;

FIG. 6 is a view showing another block image;

FIG. 7 is a block diagram schematically showing configuration of a run length calculating circuit;

DETAILED DESCRIPTION OF THE PREFERRED EMBODIMENTS

Figure 1:
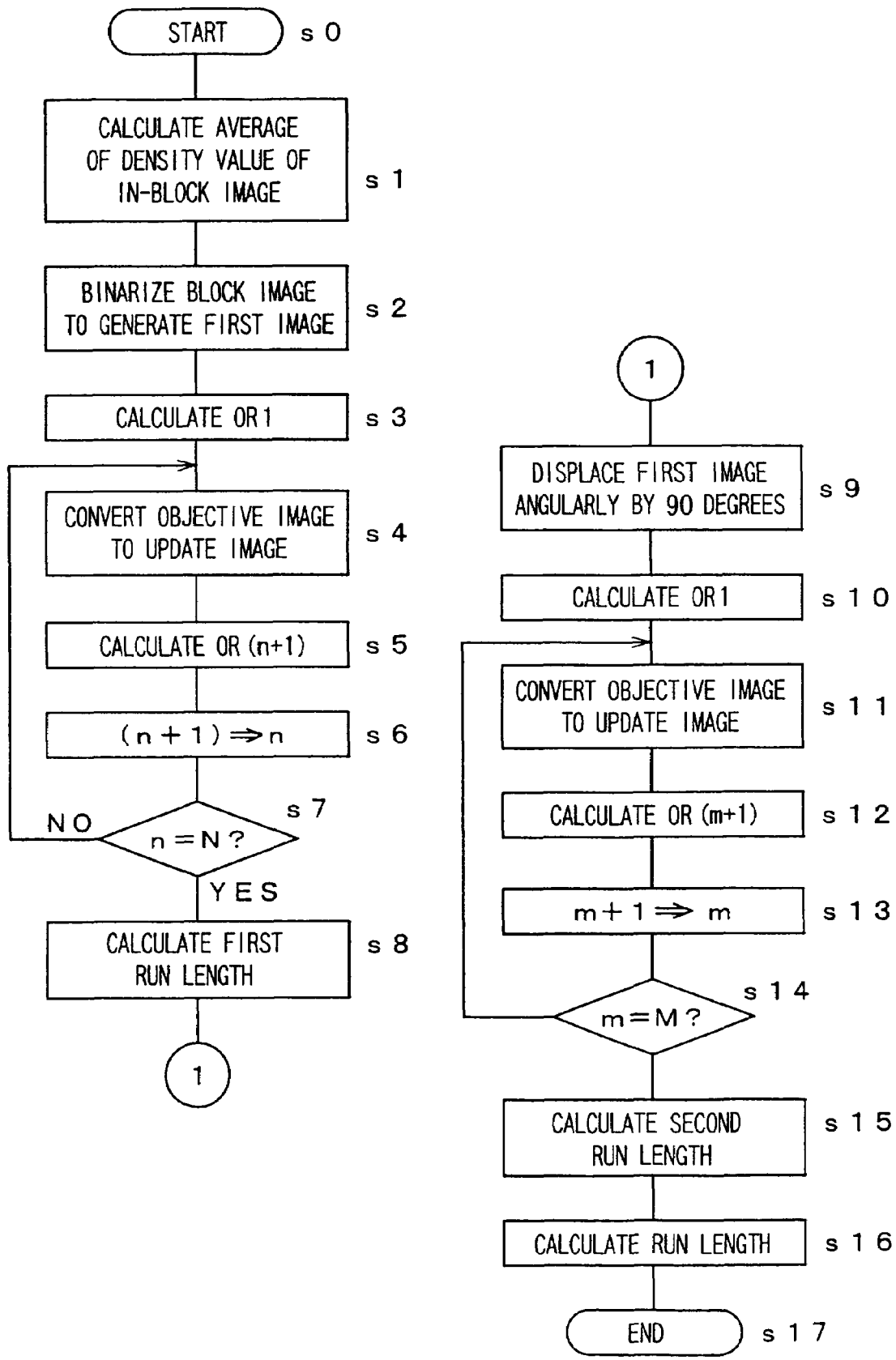
FIG. 1 is a flowchart showing a procedure of calculating run length in an image processing method according to one embodiment of the invention.

Now referring to the drawings, preferred embodiments of the invention are described below.

FIG. 1 is a flowchart showing a procedure of calculating run length in an image processing method according to one embodiment of the invention. FIG. 2 is a view showing a block image 11. The image processing method according to the embodiment of the invention is a method of calculating run length R of the block image 11. In the embodiment of the invention, there is a case where a processing objective image is represented as "an objective image". The run length R is a number of continuous pixels of pixels having the same density value being spatially continuing.

The block image 11 is, for instance, a part of an input image 12 and consists of a plurality of pixels. In the embodiment of the invention, the block image 11 consists of 25 pixels being spatially continuing and given by multiplying 5 pixels lined in a predetermined main scanning direction I by 5 pixels lined in a sub-scanning direction J which is a first direction perpendicular to the main scanning direction.

For instance, an orthogonal coordinate system having a coordinate axis i in the main scanning direction I and a coordinate axis j in the sub-scanning direction J (hereinafter with possibility of being represented as "i-j coordinate system") is assumed. In the i-j coordinate system, coordinates of each pixel in the block image 11 is represented as (i,j) and a pixel on the coordinates (i, j) is represented as a pixel B(i,j). A density value of the pixel B(i, j) is represented as f(i,j). Here, i is a variable representing a position on the coordinate axis i, and j is a variable representing a position on the coordinate axis j. In the embodiment of the invention, an integer equal to or more than 0 and equal to or less than 4, i.e., one of integers 0, 1, 2, 3 and 4, is taken for i as well as j.

The block image 11 is given in step s0 of the flowchart shown in FIG. 1 and a procedure of calculating the run length R is started and the procedure proceeds to step s1. In step s1, an average value "ave" of the density values in the block image 11 is calculated and the procedure proceeds to step s2. In step s2, binarization is performed so that the block image 11 will become binarized image consisting of at least either white pixel or black pixel on the basis of the average value "ave" calculated in step s1 and value f (i,j) of the pixel B (i,j) will become either 0 or 1. The procedure proceeds to step s3. In step s2, a density value b[n] (i,j) of the pixel B (i,j) of the block image 11 to be given after the binarization is calculated on the basis of the following equation (1).

$$b[n](i, j) = \begin{cases} 1 & (f(i, j) > \text{ave}) \\ 0 & (f(i, j) \leq \text{ave}) \end{cases} \quad (1)$$

FIGS. 3A to 3E are views showing a first image 11A, a second image 11B, a third image 11C, a fourth image 11D and a fifth image 11E. Values 0 and 1 in FIGS. 3A to 3E are density value f(i,j). The block image binarized in step s2 (hereinafter represented as the first image 11A (see FIG. 3A)) consists of at least either effective density pixel whose density value b[n] (i,j) is 1 or ineffective density pixel whose density value b[n] (i,j) is 0. In addition, the second image 11B through the fifth image 11E (see FIGS. 3B to 3E) also consist of at least either effective density pixel whose density value b[n] (i,j) is 1 or ineffective density pixel whose density value b[n] (i,j) is 0.

With reference to FIG. 1, in step s3 as a first process, an identifying value ORn of a n-th image is set and an identifying value OR1 of the first image 11A is calculated on condition where n=1 and the procedure proceeds to step s4. In step S3, the identifying value ORn is a parameter representing whether an effective density pixel exists in the n-th image. When the effective density pixel exists in the n-th image, ORn is defined as 1 and when the effective density pixel does not exist in the n-th image, ORn is defined as 0. Here, n is a natural number equal to or more than 1 and equal to or less than N. N is the number of pixels lined in the sub-scanning direction J of the block image 11 and N is defined as 5 in the embodiment of the invention.

Figure 3A:
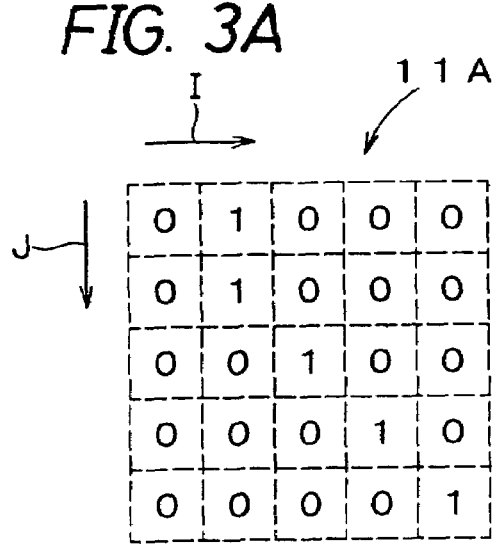
FIGS. 3A to 3E are views showing a first image, a second image, a third image, a fourth image and a fifth image.

Since the first image 11A shown in FIG. 3A has the effective density pixel having density value b[n](i,j)=1, identifying value OR1 is equal to 1.

In step s4 as a second process, the n-th image is defined as the objective image and one of pixels in the objective image is defined as the interest pixel, and a pixel neighboring the downstream side in the sub-scanning direction J with respect to the interest pixel is defined as a neighboring pixel. As to each interest pixel having at least one neighboring pixel, when a first condition on which the interest pixel is an effective density pixel and a second condition on which at least one neighboring pixel with respect to the interest pixel is an effective density pixel are satisfied, the interest pixel is defined as an effective density pixel, and when either the first condition or the second condition is satisfied, the interest pixel is defined as an ineffective density pixel. And the objective image is converted to an update image on lines from which one line is reduced in the sub-scanning direction J, in other words, from which one line is reduced in the main scanning direction I and the update image is defined as a (n+1)-th image and the procedure proceeds to step s5. Converting processing in step s4 will be after-mentioned.

In step s5 as a third process, an identifying value OR(n+1) representing whether an effective density pixel exists in the (n+1)-th image which is the update image is calculated and the procedure proceeds to step s6. In step s6, (n+1) is defined as a new n and the procedure proceeds to step s7. In other words, in step s6, the (n+1)-th image which is the update image is defined as the n-th image which is a new objective image.

In step s7, whether n is equal to N is judged and when it is judged that n is equal to N, the procedure proceeds to step s8. When it is judged that n is not equal to N, the procedure returns to step s4. In step s7, a case where n is equal to N corresponds to a case where the objective image is an image extending in the main scanning direction I as indicated by the fifth image 11E shown in FIG. 3E, in other words, an image on only one line in the sub-scanning direction.

Figure 3B:
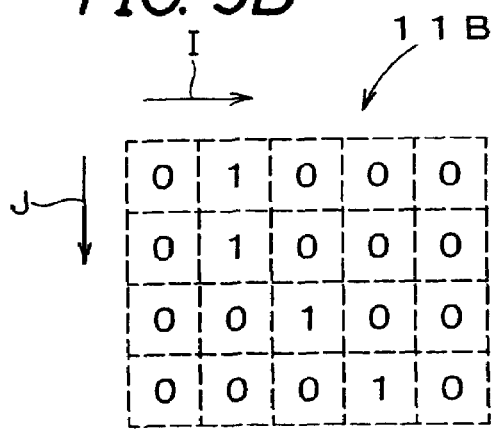
Figure 3C:
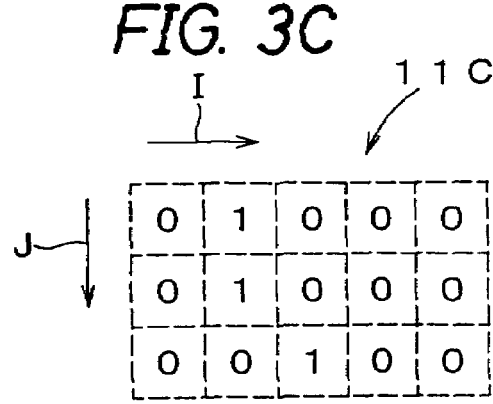
Figure 3D:
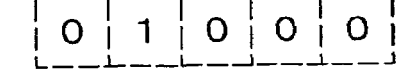
Figure 3E:
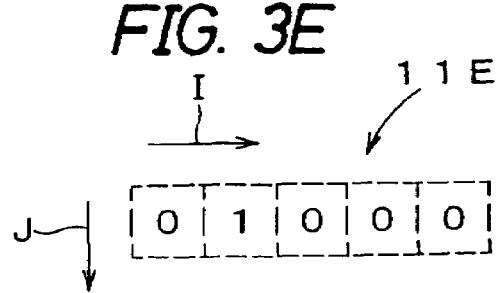

As mentioned above, steps s4 to s7 are repeated until the objective image in step s6 is lined on only one line in the sub-scanning direction J. In the embodiment of the invention, the objective image after step s6 is as follows:

when n=2, the second image 11B consisting of 5×4 pixels shown in FIG. 3B;

when n=3, the third image 11C consisting of 5×3 pixels shown in FIG. 3C;

when n=4, the fourth image 11D shown in FIG. 3D; and when n=5, the fifth image 11E shown in FIG. 3E.

In step s8 as a fourth process, all identifying values OR1 to ORN calculated in the above-mentioned steps s3 and s5 are added and a first run length R1 is calculated and the procedure proceeds to step s9. As mentioned above, the first run length R1 can be calculated by such simple calculation as addition of each identifying value. In the embodiment of the invention, since the values of OR1, OR2, OR3, OR4 and OR5 are equal to 1, the value of the first run length R1 is 5.

FIG. 4A is a view showing the first image 11A and FIG. 4B is a view showing a first rotated image 12A. In step s9 in the flowchart shown in FIG. 1, the first image 11A generated in step s2 shown in FIG. 4A is angularly displaced by 90 degrees clockwise and the displaced image is defined as the first rotated image 12A shown in FIG. 4B and the procedure proceeds to step s10.

In step s10 which is similar processing to step s3 as the first process, an identifying value ORm of the m-th image is set and the identifying value OR1 of the first rotated image 12A is calculated on condition where m=1, and the procedure proceeds to step s11. In step s10, the identifying value ORm is a parameter representing whether an effective density pixel whose density value is equal to 1 exists in the m-th image. When the effective density pixel exists in the m-th image, ORm is defined as 1 and when the effective density pixel does not exist in the m-th image, ORm is defined as 0. Here, m is a natural number equal to or more than 1 and equal to or less than M. M is the number of pixels lined in the main scanning direction I which is the second direction of the block image 11 and M is defined as 5 in the embodiment of the invention. Since the first image 12A shown in FIG. 4B has the effective density pixel whose density value is equal to 1, identifying value OR1 is equal to 1.

In step s11, the m-th image is defined as an objective image and one of pixels in the objective image is defined as an interest pixel and the pixel neighboring the downstream side in the main scanning direction I in the block image 11 with respect to the interest pixel is defined as the neighboring pixel. As to each interest pixel having at least one neighboring pixel, when a third condition on which the interest pixel is an effective density pixel and a fourth condition on which at least one neighboring pixel with respect to the interest pixel is an effective density pixel are satisfied, the interest pixel is defined as an effective density pixel, and when either the third condition or the fourth condition is satisfied, the interest pixel is defined as an ineffective density pixel. And then the objective image is converted to an update image on lines from which one line is reduced in the main scanning direction I, in other words, from which one line is reduced in the sub-scanning direction J and the update image is defined as an (m+1)-th image, and the procedure proceeds to step s12. In the embodiment of the invention, a fifth process corresponds to the above-mentioned steps s9 to s11.

In step s12 as a sixth process, an identifying value OR(m+1) representing whether an effective density pixel exists in the (m+1)-th image which is the update image is calculated, and the procedure proceeds to step s13. In step s13, (m+1) is defined as a new m, and the procedure proceeds to step s14. In other words, in step s13, the (m+1)-th image which is the update image is defined as the m-th image which is a new objective image.

In step s14, whether m is equal to M is judged and when it is judged that m is equal to M, the procedure proceeds to step s15, and when it is judged that m is not equal to M, the procedure returns to step s11. In step s14, a case where m is equal to M corresponds to a case where the objective image is an image extending in the sub-scanning direction J, in other words, an image on only one line in the main scanning direction I.

As mentioned above, steps s11 to s14 are repeated until the objective image in step s13 is lined on only one line in the main scanning direction I. In the embodiment of the invention, the objective image after step s13 is as follows:

when m=2, a second rotated image consisting of 5×4 pixels;

when m=3, a third rotated image consisting of 5×3 pixels;

when m=4, a fourth rotated image; and when m=5, a fifth rotated image.

In step s15 as a seventh process, all identifying values OR1 to ORM calculated in the above-mentioned steps s10 and s12 are added and a second run length R2 is calculated, and the procedure proceeds to step s16.

In step s16 as an eighth process, the first run length R1 calculated in step s8 is compared with the second run length R2 calculated in step s15 and a value of greater run length between R1 and R2 is calculated as run length R of the block image 11, and the procedure proceeds to step s17 and all procedures are finished. In the embodiment of the invention, since the value of the first run length R1 as well as the value of the second run length R2 is 5, the value of the run length R of the block image 11 is 5.

Figure 5A:
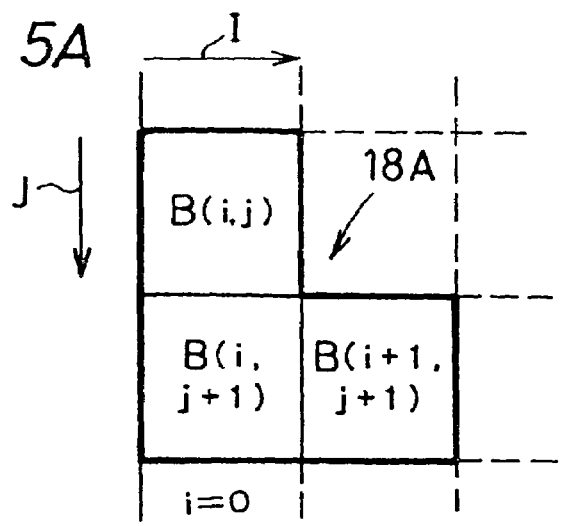
FIGS. 5A to 5C are views showing a L-shape template, a convex template and a reverse L-shape template being used at the time of converting an objective image to an update image in step s4 of the flowchart shown in FIG. 1.
Figure 5B:
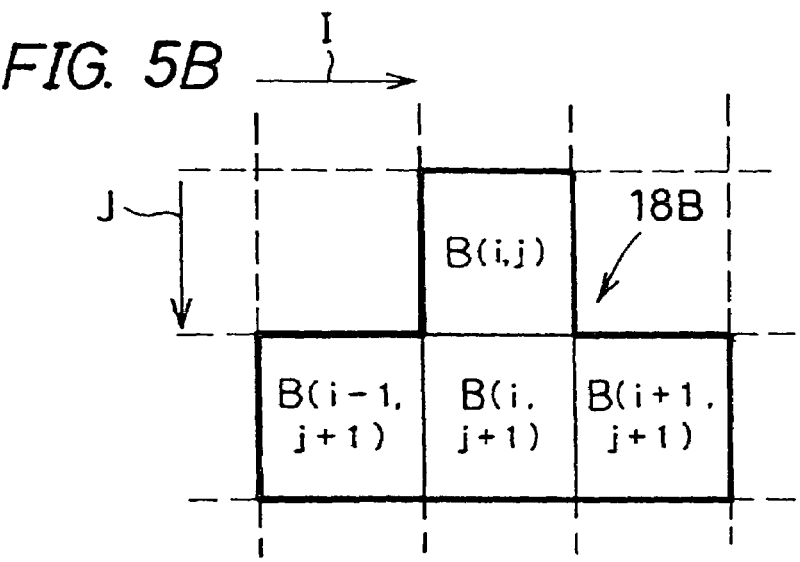
Figure 5C:
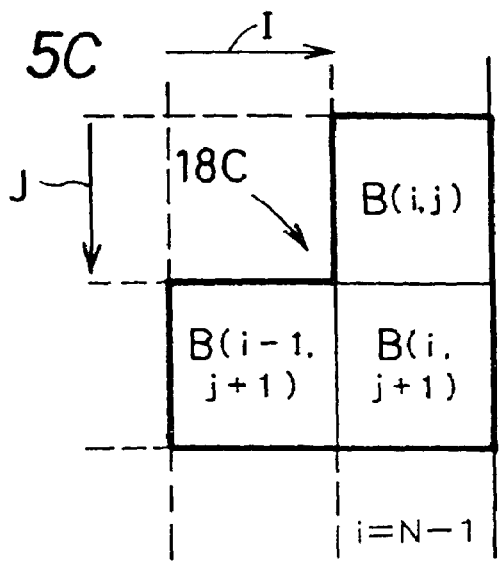

FIGS. 5A to 5C are views showing a L-shape template 18A, a convex template 18B and a reverse L-shape template 18C which are used at the time of converting the objective image to the update image in step s4 of the flowchart shown in FIG. 1. Each template 18A, 18B and 18C is a unit for detecting presence or absence of continuous pixel in the block image 11, and consists of the interest pixel and the neighboring pixels neighboring the downstream side in the sub-scanning direction J with respect to the interest pixel.

The L-shape template 18A shown in FIG. 5A is used in a case where i=0, and when the pixel B(i,j) is defined as a first interest pixel, the L-shape template 18A consists of the first interest pixel B(i,j), a first neighboring pixel B(i,j+1) neighboring the downstream side in the sub-scanning direction J with respect to the first interest pixel B(i,j) and a second neighboring pixel B(i+1,j+1) neighboring the downstream side in the main scanning direction I with respect to the first neighboring pixel B (i, j+1).

The convex template 18B shown in FIG. 5B is used in the case where i is equal to or more than 1 and is equal to or less than (N−2), and when the pixel B(i,j) is defined as a second interest pixel, the convex template 18B consists of the second interest pixel B(i,j), a third neighboring pixel B(i,j+1) neighboring the downstream side in the sub-scanning direction J with respect to the second interest pixel B(i,j), a fourth neighboring pixel B(i−1,j+1) neighboring the upstream side in the main scanning direction I with respect to the third neighboring pixel B(i,j+1) and a fifth neighboring pixel B(i+1,j+1) neighboring the downstream side in the main scanning direction I with respect to the third neighboring pixel B(i,j+1).

The reverse L-shape template 18C shown in FIG. 5C is used in the case where i=(N−1), and when the pixel B(i,j) is defined as a third interest pixel, the reverse L-shape template 18C consists of the third interest pixel B(i,j), a sixth neighboring pixel B(i,j+1) neighboring the downstream side in the sub-scanning direction J with respect to the third interest pixel B(i,j) and a seventh neighboring pixel B(i−1,j+1) neighboring the upstream side in the main scanning direction I with respect to the sixth neighboring pixel B(i,j+1).

In the embodiment of the invention, the L-shape template 18A is used for the interest pixel in the case where i=0, the convex template 18B is used for the interest pixel in the case where i=1, 2, and 3, and the reverse L-shape template 18C is used for the interest pixel in the case where i=4.

In step s4, when the n-th image and the (n+1)-th image are defined as the objective image and the update image, respectively, the density value b[n+1](i,j) is given by the following equation (3) for the use of the L-shape template 18A, the following equation (2) for the use of the convex template 18B, and the following equation (4) for the use of the reverse L-shape template 18C, respectively.

$$b[n+1](i,j)=b[n](i,j)\&\{b[n](i-1,j+1)|b[n](i,j+1)|b[n](i+1,j+1)\} \quad (2)$$

$$b[n+1](i,j)=b[n](i,j)\&\{b[n](i,j+1)|b[n](i+1,j+1)\} \quad (3)$$

$$b[n+1](i,j)=b[n](i,j)\&\{b[n](i-1,j+1)|b[n](i,j+1)\} \quad (4)$$

In the above mentioned equations (2) to (4), "&" is an operation symbol of logical product and "|" is an operation symbol of logical addition.

According to the above mentioned equations (2) to (4), for instance, when the density value b[n](i,j) of the interest pixel B(i,j) of the objective image is 0, the density value b[n+1](i,j) of the pixel of the update image corresponding to the interest pixel B (i,j) becomes 0 irrespective of the density values b[n](i,j+1), b[n](i−1,j+1) and b[n](i+1,j+1) of the neighboring pixels B(i,j+1), B(i−1,j+1) and B(i+1,j+1). In addition, for instance, when every density value of each neighboring pixel is 0, the density value of the pixel of the update image corresponding to the interest pixel becomes 0 irrespective of the density values of the neighboring pixels. In addition, for instance, when the density value of the interest pixel is 1 and the density value of at least one of the neighboring pixels is 1, the density value of the pixel of the update image corresponding to the interest pixel becomes 1. In other words, when the density value of the interest pixel and the density value of the neighboring pixel are continuously 1, the density value of the pixel of the update image corresponding to the interest pixel becomes 1 and in other case becomes 0.

In the embodiment of the invention, the density values of the pixels B1(1,0), B1(1,1), B1(2,2), B1(3,3) and B1(4,4) are 1 and the density values of the remaining pixels are 0 in the first image 11A shown in FIG. 3A. The first image 11A is converted to the second image 11B which is shown in FIG. 3B and consists of lines reducing one line lined in the sub-scanning direction J from the lines for the first image 11A with use of templates 18A to 18C shown in FIGS. 5A to 5C and the equations (2) to (4) for the first image 11A. In detail, the L-shape template 18A is used for the interest pixel B1(0,k1) whose i=0, the reverse L-shape template 18C is used for the interest pixel B1 (4,k1) whose i=4, and the convex template 18B is used for the interest pixel B1 (i,k1) whose i=1, 2, or 3, where k1 is equal to 0, 1, 2 or 3.

The density values of the pixels B2(1,0), B2(1,1), B2(2,2) and B2(3,3) are 1 and the density values of the remaining pixels are 0 in the second image 11B shown in FIG. 3B. The second image 11B is converted to the third image 11C which is shown in FIG. 3C and consists of lines reducing one line lined in the sub-scanning direction J from the lines for the second image 11B with use of templates 18A to 18C shown in FIGS. 5A to 5C and the equations (2) to (4) for the second image 11B. In detail, the L-shape template 18A is used for the interest pixel B2(0,k2) whose i=0, the reverse L-shape template 18C is used for the interest pixel B2(4,k2) whose i=4, and the convex template 18B is used for the interest pixel B2(i,k2) whose i=1, 2, or 3, where k2 is equal to 0, 1 or 2.

The density values of the pixels B3(1,0), B3(1,1) and B3(2,2) are 1 and the density values of the remaining pixels are 0 in the third image 11C shown in FIG. 3C. The third image 11C is converted to the fourth image 11D which is shown in FIG. 3D and consists of lines reducing one line lined in the sub-scanning direction J from the lines for the third image 11C with use of templates 18A to 18C shown in FIGS. 5A to 5C and the equations (2) to (4) for the third image 11C. In detail, the L-shape template 18A is used for the interest pixel B3(0,k3) whose i=0, the reverse L-shape template 18C is used for the interest pixel B3(4,k3) whose i=4, and the convex template 18B is used for the interest pixel B3(i,k3) whose i=1, 2, or 3, where k3 is equal to 0 or 1.

The density values of the pixels B4(1,0) and B4(1,1) are 1 and the density values of the remaining pixels are 0 in the fourth image 11D shown in FIG. 3D. The fourth image 11D is converted to the fifth image 11E which is shown in FIG. 3E and consists of lines reducing one line lined in the sub-scanning direction J from the lines for the fourth image 11D with use of templates 18A-18C shown in FIGS. 5A to 5C and the equations (2) to (4) for the fourth image 1D. In detail, the L-shape template 18A is used for the interest pixel B4(0,0) whose i=0, the reverse L-shape template 18C is used for the interest pixel B4(4,0) whose i=4, and the convex template 18B is used for the interest pixel B4(i,0) whose i=1, 2, or 3. The density values of the pixel B5(1,0) is 1 and the density values of the remaining pixels are 0 in the fifth image 11E shown in FIG. 3E.

With respect to the first image 11A through the fifth image to 11E in FIGS. 3A to 3E, the identifying value OR1 of the first image 11A is 1, an identifying value OR2 of the second image 11B is 1, an identifying value OR3 of the third image 11C is 1, an identifying value OR4 of the fourth image 11D is 1 and an identifying value OR5 of the fifth image 11E is 1. When these identifying values OR1 to OR5 are added (i.e., summed), the first run length R1 becomes 5.

Similarly, with use of the above mentioned templates 18A to 18C and equations (2) to (4), as to the identifying values of the first through the fifth rotated images, OR1=1, OR2=1, OR3=1, OR4=1 and OR5=1, and the second run length R2 becomes 5. A run length R calculated in such a method as mentioned above is applied as characteristic quantity for identifying a pixel in each area in an image.

FIG. 6 is a view showing another block image 14. The density values of the pixels B1(0,1), B2(1,2), B3(2,2), B4(3,3) and B5(4,3) are 1, respectively, and the density values of the remaining pixels are 0 in the first image 14A of the block image 14 shown in FIG. 6. In the block image 14 shown in FIG. 6, the first run length R1 is calculated as 3 and the second run length R2 is calculated as 5, with use of the above-mentioned method of calculating run length.

When actual run length of the other block image 14 is counted, the run length is 5 as shown in FIG. 6, but the first run length R1 is calculated as 3 with use of the above-mentioned method of calculating run length and is smaller than the actual run length which is 5. In addition, the second run length R2 is calculated as 5 with use of the above-mentioned method of calculating run length and coincides with the actual run length. Therefore, the first run length R1 and the second run length R2 is calculated for the block image and larger run length of the first run length R1 and the second run length R2 is defined as the run length R and thereby the run length R can be calculated with a high degree of accuracy.

Table 1 is a table showing relation between each of the identifying values OR1 to OR5 and the first run length R1. In steps s8 and s15 of the flowchart in FIG. 1, the first run length R1 and the second run length R2 are respectively calculated with addition of each of identifying values OR1 to OR5, but the first run length R1 and the second run length R2 may be calculated by looking up Table 1 and without operation for each of the identifying values OR1 to OR5. In Table 1, a number "1" or a number "0" is substituted for a symbol "*" and either the number "1" or the number "0" is allowed as a number to be substituted.

TABLE 1

| OR1 | OR2 | OR3 | OR4 | OR5 | RUN LENGTH |
|-----|-----|-----|-----|-----|------------|
| *   | *   | *   | *   | 1   | 5          |
| *   | *   | *   | 1   | 0   | 4          |
| *   | *   | 1   | 0   | 0   | 3          |
| *   | 1   | 0   | 0   | 0   | 2          |
| 1   | 0   | 0   | 0   | 0   | 1          |
| 0   | 0   | 0   | 0   | 0   | 0          |

In step s9 of the flowchart shown in FIG. 1, the first image 11A is angularly displaced by 90 degrees clockwise. However, the direction of angular displacement is not limited to clockwise, and angular displacement by 90 degrees counterclockwise may be allowed. In other words, it is sufficient that there is condition under which the first rotated image 12A is relatively displaced angularly by 90 degrees for the first image 11A.

In the processing of calculating the run length R of the above-mentioned block image 11, the first image 11A is converted up to the fifth image 11E, but in processing performed by software, when the identifying value ORn becomes 0 in the process of converting the first image 11A up to the fifth image 11E, each of the remaining identifying value is defined as 0 and succeeding repetition of processing is omitted and thereby processing can be performed at a high speed. For instance, when the identifying value OR1 of the first image 11A becomes 0 in step s3 of the flowchart shown in FIG. 1, each of identifying values OR2 to OR5 except OR1 may be defined as 0 and the procedure may proceed to step s8.

In addition, steps s9 to s15 are defined as processing to be performed after step s8 in the flowchart shown in FIG. 1, however, for instance, processing of steps s1 to s8 and processing of steps s9 to s15 may be performed in parallel.

FIG. 7 is a block diagram schematically showing configuration of a run length calculating circuit 30. The run length calculating circuit 30 comprises a first run length calculating portion 31, a second run length calculating portion 32 and a maximum run length calculating portion 33, and calculates the run length R of the block image 11. The first run length calculating portion 31 is a circuit for calculating the run length R1 of the block image 11, and the second run length calculating portion 32 is a circuit for calculating the run length R2 of a rotated block image 21 made by angular displacement of the block image 11 by 90 degrees clockwise. The maximum run length calculating portion 33 compares the first run length R1 calculated by the first run length calculating portion 31 with the second run length R2 calculated by the second run length calculating portion 32 and larger run length of the first run length R1 and the second run length R2 is calculated as the run length R of the block image 11.

Figure 8:
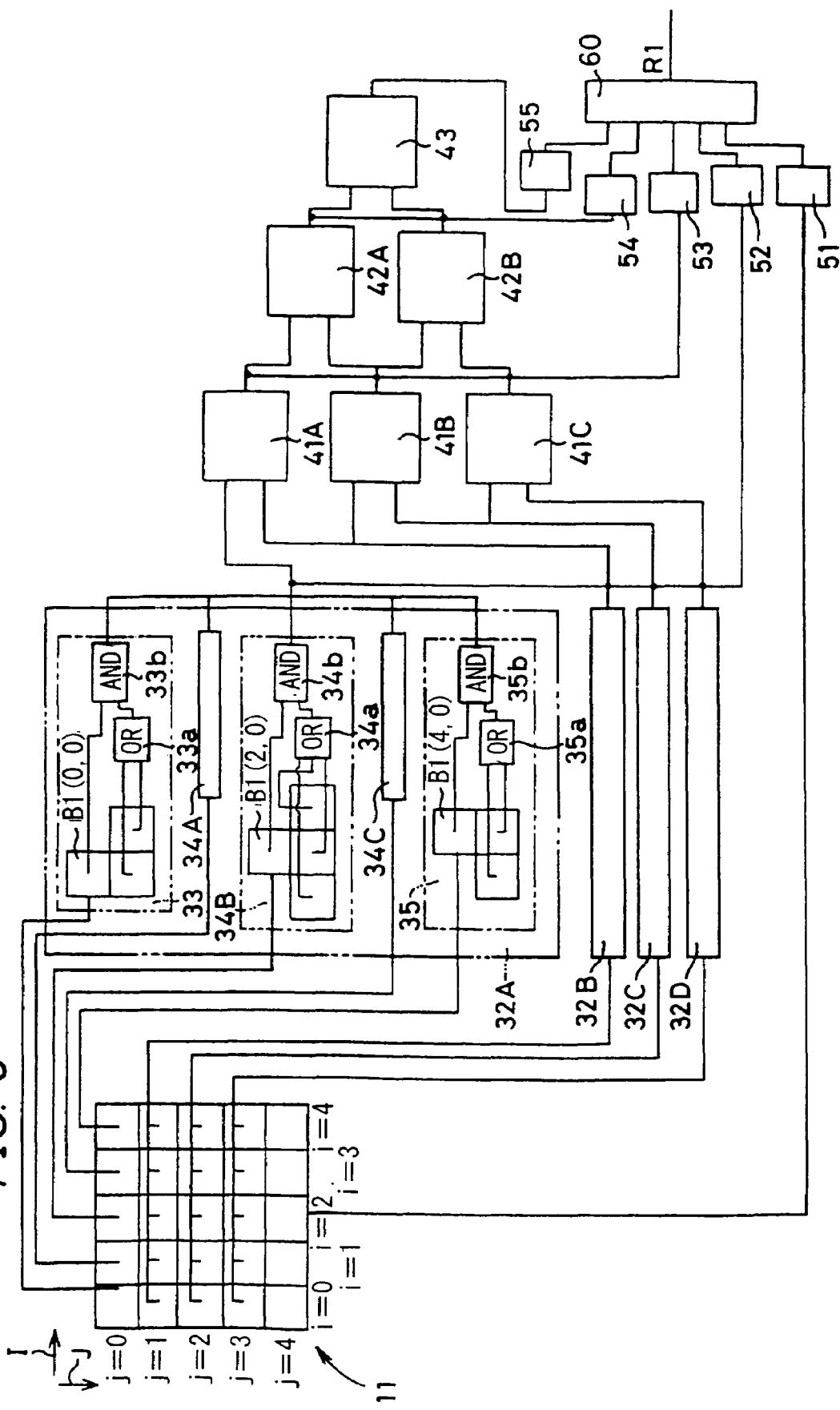
FIG. 8 is a block diagram showing configuration of a first run length calculating portion.

FIG. 8 is a block diagram showing configuration of the first run length calculating portion 31. Since the first run length calculating portion 31 and the second run length calculating portion 32 perfectly have the same configuration, detailed explanation about the first run length calculating portion 31 is performed and explanation about the second run length calculating portion 32 is omitted. The first run length calculating portion 31 comprises a first line calculating portion 32A, a second line calculating portion 32B, a third line calculating portion 32C, a fourth line calculating portion 32D, a fifth line calculating portion 41A, a sixth line calculating portion 41B, a seventh line calculating portion 41C, an eighth line calculating portion 42A, a ninth line calculating portion 42B, a tenth line calculating portion 43, a first identifying value calculating portion 51, a second identifying value calculating portion 52, a third identifying value calculating portion 53, a fourth identifying value calculating portion 54, a fifth identifying value calculating portion 55 and a judging processing portion 60.

The first line calculating portion 32A defines each pixel B1(i,0) in the line with j=0 in the first image 11A of the block image 11 as an interest pixel and calculates the density value of the pixel of the second image 11B which is update image corresponding to the interest pixel. The second line calculating portion 32B defines each pixel B1(i,1) in the line with j=1 in the first image 11A of the block image 11 as an interest pixel and calculates the density value of the pixel of the second image 11B which is update image corresponding to the interest pixel. The third line calculating portion 32C defines each pixel B1(i,2) in the line with j=2 in the first image 11A of the block image 11 as an interest pixel and calculates the density value of the pixel of the second image 11B which is update image corresponding to the interest pixel. The fourth line calculating portion 32D defines each pixel B1(i,3) in the line with j=3 in the first image 11A of the block image 11 as an interest pixel and calculates the density value of the pixel of the second image 11B which is update image corresponding to the interest pixel. Since the first to fourth line calculating portions 32A to 32D have the same configuration, detailed explanation about the first line calculating portion 32A is performed and detailed explanation about the second to fourth line calculating portions 32B to 32D is omitted.

The first line calculating portion 32A comprises a first density value calculating portion 33, a second density value calculating portion 34A, a third density value calculating portion 34B, the fourth density value calculating portion 34C and the fifth density value calculating portion 35.

The first density value calculating portion 33 defines pixel B1(0,0) as an interest pixel and calculates the density value of the pixel of the second image 11B corresponding to the interest pixel by using the L-shape template 18A shown in FIG. 5A. The first density value calculating portion 33 comprises a logical addition operating portion 33a and a logical product operating portion 33b. The logical addition operating portion 33a calculates a logical addition of the density value of the neighboring pixel in the L-shape template 18A and gives the logical addition to the logical product operating portion 33b. The logical product operating portion 33b calculates a logical product between the density value of the interest pixel in the L-shape template 18A and the logical addition given from the logical addition operating portion 33a.

The second to fourth density value calculating portions 34A to 34C define pixels B1(1,0), B1(2,0) and B1(3,0) as interest pixels, respectively, and calculate the density value of the pixel of the second image 11B corresponding to each of the interest pixels by using the convex template 18B shown in FIG. 5B. The second to fourth density value calculating portions 34A to 34C have the same configuration and comprise a logical addition operating portion 34a and a logical product operating portion 34b. The logical addition operating portion 34a calculates a logical addition of the density value of the neighboring pixel in the convex template 18B and gives the logical addition to the logical product operating portion 34b. The logical product operating portion 34b calculates a logical product between the density value of the interest pixel in the convex template 18B and the logical addition given from the logical addition operating portion 34a.

The fifth density value calculating portion 35 defines pixels B1(4,0) as an interest pixel and calculates the density value of the pixel of the second image 11B corresponding to the interest pixel by using the reverse L-shape template 18C shown in FIG. 5C. The fifth density value calculating portion 35 comprises a logical addition operating portion 35a and a logical product operating portion 35b. The logical addition operating portion 35a calculates a logical addition of the density value of the neighboring pixel in the reverse L-shape template 18C and gives the logical addition to the logical product operating portion 35b. The logical product operating portion 35b calculates a logical product between the density value of the interest pixel in the reverse L-shape template 18C and the logical addition given from the logical addition operating portion 35a. As mentioned above, The first line to fourth line calculating portions 32A to 32D convert the first image 11A to the second image 11B by using the logical product and output the second image 11B.

The fifth line calculating portion 41A defines each pixel B2(i,0) in the line with j=0 in the second image 11B converted by the first to fourth line calculating portions 32A to 32D as an interest pixel and calculates the density value of the pixel of the third image 11C which is the update image corresponding to the interest pixel. The sixth line calculating portion 41B defines each pixel B2(i,1) in the line with j equal to 1 in the second image 11B as an interest pixel and calculates the density value of the pixel of the third image 11C which is the update image corresponding to the interest pixel. The seventh line calculating portion 41C defines each pixel B2(i,2) in the line with j=2 in the second image 11B as an interest pixel and calculates the density value of the pixel of the third image 11C which is the update image corresponding to the interest pixel. The fifth to seventh line calculating portions 41A to 41C have the same configuration as the first to fourth line calculating portions 32A to 32D and convert the second image 11B to the third image 11C by using a logical product and output the third image 11C.

The eighth line calculating portion 42A defines each pixel B3(i,0) in the line with j=0 in the third image 11C converted by the fifth to seventh line calculating portions 41A to 41C as an interest pixel and calculates the density value of the pixel of the fourth image 11D which is the update image corresponding to the interest pixel. The ninth line calculating portion 42B defines each pixel B3(i,1) in the line with j=1 in the third image 11C as an interest pixel and calculates the density value of the pixel of the fourth image 11D which is the update image corresponding to the interest pixel. The eighth and ninth line calculating portions 42A and 42B have the same configuration as the fifth to seventh line calculating portions 41A to 41C and convert the third image 11C to the fourth image 11D by using a logical product and output the fourth image 11D.

The tenth line calculating portion 43 defines each pixel B4(i,0) in the line with j=0 in the fourth image 11D converted by the eighth and ninth line calculating portions 42A and 42B as an interest pixel and calculates the density value of the pixel of the fifth image 11E which is the update image corresponding to the interest pixel. The tenth line calculating portions 43 has the same configuration as the eighth and ninth line calculating portions 42A and 42B and converts the fourth image 11D to the fifth image 11E by using AND and outputs the fifth image 11E. In the embodiment of the invention, an image converting section comprises the first to tenth line calculating portions 32A to 32D, 41A to 41C, 42A, 42B and 43.

A parameter calculating section comprises the first identifying value calculating portion 51, the second identifying value calculating portion 52, the third identifying value calculating portion 53, the fourth identifying value calculating portion 54 and the fifth identifying value calculating portion 55 and they are realized by logical addition operating means. The first identifying value calculating portion 51 judges by using a logical addition whether there is a pixel whose density value becomes 1 among pixels in the first image 11A. When there is such a pixel, the identifying value OR1=1 is outputted and when there is not such a pixel, the identifying value OR1=0 is outputted. The second identifying value calculating portion 52 judges by using a logical addition whether there is a pixel whose density value becomes 1 among pixels in the second image 11B outputted from the first to fourth line calculating portions 32A to 32D.

When there is such a pixel, the identifying value OR2=1 is outputted and when there is not such a pixel, the identifying value OR2=0 is outputted.

The third identifying value calculating portion 53 judges by using a logical addition whether there is a pixel whose density value becomes 1 among pixels in the third image 11C outputted from the fifth to seventh line calculating portions 41A to 41C. When there is such a pixel, the identifying value OR3=1 is outputted and when there is not such a pixel, the identifying value OR3=0 is outputted. The fourth identifying value calculating portion 54 judges by using a logical addition whether there is a pixel whose density value becomes 1 among pixels in the fourth image 11D outputted from the eighth to ninth line calculating portions 42A to 42B. When there is such a pixel, the identifying value OR4=1 is outputted and when there is not such a pixel, the identifying value OR4=0 is outputted. The fifth identifying value calculating portion 55 judges by using a logical addition whether there is a pixel whose density value becomes 1 among pixels in the fifth image 11E outputted from the tenth line calculating portions 43. When there is such a pixel, the identifying value OR5=1 is outputted and when there is not such a pixel, the identifying value OR5=0 is outputted.

The judging processing portion 60 as a continuous-pixel-number calculating section calculates the first run length R1 on the basis of the identifying values OR1 to OR5 outputted from the first to fifth identifying value calculating portions 51 to 55.

On the assumption that the second run length calculating portion 32 has the same configuration as the first run length calculating portion 31, the second run length R2 is given by calculating the run length of the rotated block image 21 made by angular displacement of the block image 11 by 90 degrees clockwise. However, the configuration of the circuit of the second run length calculating portion 32 may be changed so that the first line calculating portion 32A will calculate a logical product by defining each pixel with i=0 in the first image 11A as an interest pixel and the second line calculating portion 32B will calculate a logical product by defining each pixel with i=1 in the first image 11A as an interest pixel and the third line calculating portion 32C will calculate a logical product by defining each pixel with i=2 in the first image 11A as an interest pixel and the fourth line calculating portion 32D will calculate a logical product by defining each pixel with i=3 in the first image 11A as an interest pixel, respectively, concerning the block image 11 instead of the rotated block image 21. Even when the second run length calculating portion 32 is configured as mentioned above, the second run length R2 can be calculated.

Figure 9:
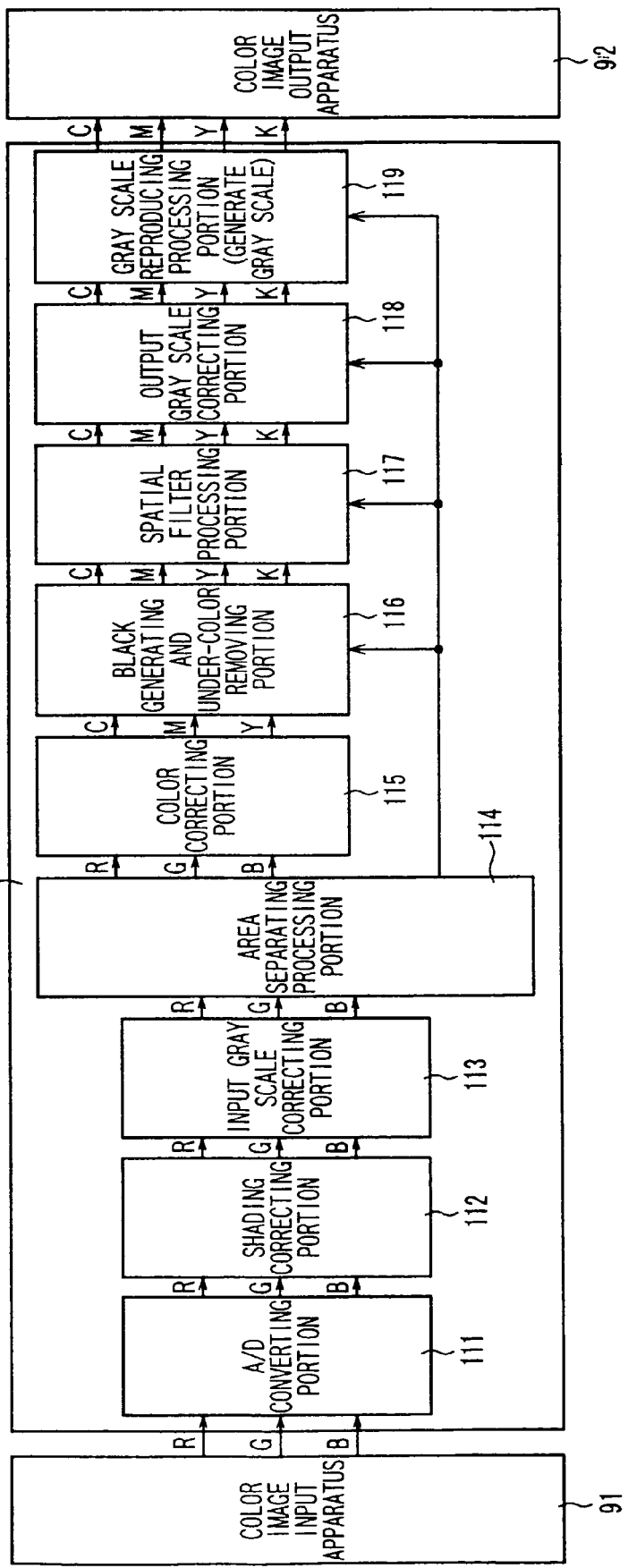
FIG. 9 is a block diagram showing configuration of a color copy apparatus provided with a color image processing apparatus according to another embodiment of the invention.
Figure 10:
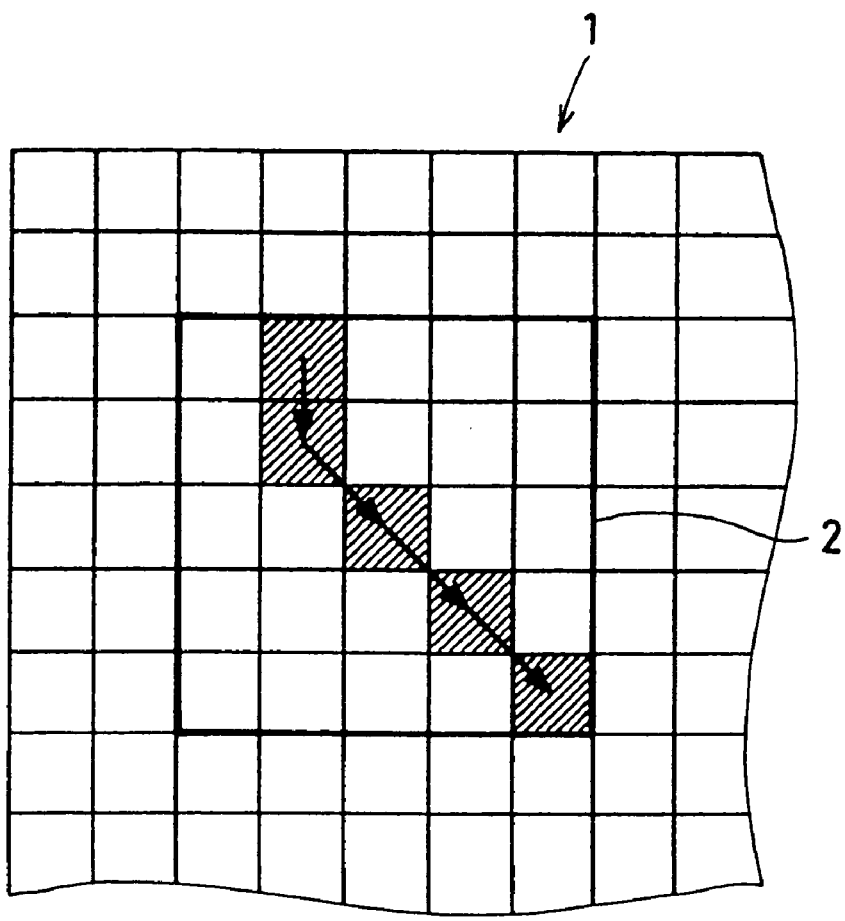
FIG. 10 is a view showing a pixel block from which run length is calculated as an example.
Figure 11:
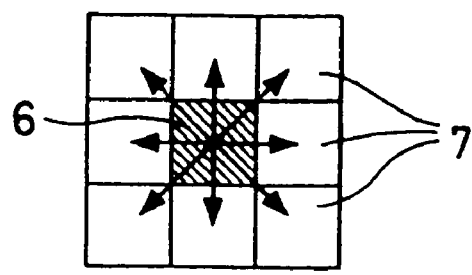
FIG. 11 is a view showing a direction in which the run length is traced on the basis of definition of the run length with respect to the pixel block shown in FIG. 10.

FIG. 9 is a block diagram showing configuration of a color copy apparatus 200 provided with a color image processing apparatus 110 according to another embodiment of the invention. The color copy apparatus 200 comprises the color processing apparatus 110, a color image input apparatus 91 and a color image output apparatus 92. The color image input apparatus 91 is, for instance, realized as a scanner apparatus which irradiates an original on which an image is formed, with light and moves a scanner head having a plurality of charge coupled devices (abbreviated as "CCD") lined in the main scanning direction to the sub-scanning direction crossing the main scanning direction and simultaneously converts reflecting light given from the original to analog reflectance signals in red (abbreviated as "R"), green (abbreviated as "G") and blue (abbreviated as "B") and outputs the converted signals. The color image output apparatus 92 is realized as an ink-jet image output apparatus for forming an image by having ink adhered on the recording sheet or an electrophotographic image output apparatus.

The color image processing apparatus 110 comprises analog/digital (hereinafter with possibility of being represented as "A/D") converting portion 111, a shading correcting portion 112, an input gray scale correcting portion 113, an area separating processing portion 114, a color correcting portion 115, a black generating and under-color removing portion 116, a spatial filter processing portion 117, an output gray scale correcting portion 118, a gray scale reproducing processing portion 119 and a central processing unit (abbreviated as "CPU", not shown). The CPU totally controls the color image processing apparatus 110.

The A/D converting portion 111 converts the analog reflectance signals of RGB of the input image given from the color image input apparatus 91 to a digital reflectance signals of RGB and gives the converted signals to the shading correcting portion 112.

The shading correcting portion 112 applies shading correcting processing to the reflectance signals given from the A/D converting portion 111 and gives the corrected reflectance signals to the input gray scale correcting portion 113. The shading correcting processing removes various distortion in the reflectance signals of the input image caused by configuration of illumination system, imaging system and image pick-up system of the color image input apparatus 91.

The input gray scale correcting portion 113 applies input gray scale correcting processing to the reflectance signals given from the shading correcting portion 112 and outputs the corrected reflectance signals. The input gray scale correcting processing is processing for converting the reflectance signals to such signals applicable for image processing as, for instance, RGB density signals indicating density of each color of RGB or the like. In addition, the input gray scale correcting processing may additionally apply color balance processing to the reflectance signals.

The area separating processing portion 114 performs separating processing for separating each pixel of the input image represented by the RGB density signals given from the input gray scale correcting portion 113 into one of a character area, a halftone dot area and a photograph area and gives an area identifying signal in which the separating processing results the black generating and under-color removing portion 116, the spatial filter processing portion 117, the gray scale reproducing processing portion 119.

The color correcting portion 115 converts the RGB density signals in the input image given from the area separating processing portion 114 to CMY density signals indicating density of cyan (abbreviated as "C"), magenta (abbreviated as "M") and yellow (abbreviated as "Y") and applies the color correcting processing to the CMY density signal and gives the CMY density signals to the black generating and under-color removing portion 116 for the purpose of loyal performance of the color reproduction in the color image output apparatus 92. The color correcting processing is concretely processing in which color turbidity based on spectral characteristics of cyan, magenta and yellow (CMY) ink or toner is removed from the CMY density signals.

The black generating and under-color removing portion 116 performs black generating processing which generates a black (abbreviated as "K") color signal on the basis of CMY color signals included in the CMY density signals of the input image given from the color correcting portion 115 and also applies under-color removing processing to the CMY color signals. The under-color removing processing is processing which subtracts the black color signal generated in the black generating processing from the CMY color signals to get new CMY color signals. As mentioned above, the black generating and under-color removing portion 116 converts the CMY density signals given from the color correcting portion 115 to CMYK color signals comprising the black color signal and the CMY color signals subtracting the black color signal and gives the CMYK color signals to the spatial filter processing portion 117. The black generating and under-color removing processing is performed on the basis of the area identifying signal given from the area separating processing portion 114.

The black generating processing is performed, for instance, by a method of skeleton black. According to detailed description about the method of skeleton black, when skeleton curved input/output characteristic is y=g(x), the color signals of cyan, magenta and yellow included in the signals to be input are C, M and Y, the color signals of cyan, magenta, yellow and black included in the signal to be output are C', M', Y' and K' and a UCR (Under Color Removal) rate is α (0<α<1), the black generating and under-color removing processing is represented by the following equations (5) to (8).

$$K' = g(\min(C,M,Y)) \quad (5)$$

$$C' = C - \alpha \cdot K' \quad (6)$$

$$M' = M - \alpha \cdot K' \quad (7)$$

$$Y' = Y - \alpha \cdot K' \quad (8)$$

The above equation (5) indicates that the color signal K' of black included in the signal to be outputted is a function of the skeleton curved input/output characteristic in which the minimum value among the color signals C, M and Y of cyan, magenta and yellow is defined as a variable. In addition, in the above equations (6) to (8), The symbol "·" is a symbol of operation indicating product. The three CMY color signals of cyan, magenta and yellow are converted to the four CMYK color signals of cyan, magenta, yellow and black on the basis of the above equations (5) to (8).

The spatial filter processing portion 117 applies spatial filter processing to the CMYK color signals of the input image given from the black generating and under-color removing portion 116 by using a digital filter and gives the CMYK color signals to which spatial filter processing is applied to the output gray scale correcting portion 118 and thereby spatial frequency characteristic of the image is corrected. Therefore, when the color image output apparatus 92 forms an image on the recording sheet, occurrence of blur and graininess deterioration on the formed image can be prevented. The spatial filter processing is performed on the basis of the area identifying signal given from the area separating processing portion 114.

Concretely, in the area separating processing portion 114, as to the area signal separated into the character area in the area separating processing portion 114, an emphasized quantity of the high frequency is increased in sharpness emphasizing processing performed in the spatial filter processing portion 117. In such processing as mentioned above, reproducibility of a black character or a color character is especially enhanced. In addition, as to the area signal separated into a halftone dot by the area separating processing portion 114, the spatial filter processing portion 117 applies low-pass filter processing to the area signal to remove the halftone dot component from the input image.

The output tone correcting portion 118 applies output gray scale correcting processing, for instance, such as processing of converting the density value included in the CMYK color signals of the input image given from the spatial filter processing portion 117 to halftone dot area rate which is characteristic value of color image output apparatus 92, and gives the halftone dot area rate to the tone reproducing processing portion 119.

The tone reproducing processing portion 119 applies the tone reproduction processing, for instance such as the binarizing processing and multi-value processing, to the CMYK color signals given from the output gray scale correcting portion 118 on the basis of an area separating identifying signal and gives the CMYK color signals to the color image output apparatus 92. For instance, binarizing processing or multi-value processing on the screen which places emphasis on the gray scale reproducibility is applied to the area signal separated into the photograph area.

The area separating processing by the area separating processing portion 114 is performed, for instance, by using the run length R as characteristic quantity. As mentioned above, using the run length R effectively as characteristic quantity representing feature of the image enables identification of each area to be performed with a high degree of accuracy. This enables optimum image processing corresponding to each area to be performed and can provide a high quality image. As mentioned above, the run length calculating circuit 30 can be installed in the area separating processing portion 114.

The program for realizing the above-mentioned image processing method by the computer system is recorded in the computer-readable recording medium which is not shown. This results in providing the recording medium on which the program for realizing the image processing method is recorded so that the recording medium can be freely carried.

In the invention, for instance, a read only memory (abbreviated as "ROM") may be also the recording medium in itself in order to performing processing by a microcomputer. In addition, in the invention, a program reading apparatus as an external apparatus which is not shown may be provided and the recording medium available for being read may be also a program medium on the assumption that the recording medium is inserted in the program reading apparatus. In both cases, a program stored in the recording medium also may have configuration by which the microcomputer accesses the program and runs the program or also may have configuration by which the program stored in the recording medium is read and downloaded to an program recording area of the computer and the program is run.

Here, the above-mentioned program medium may be the recording medium which is configured so as to be separated from the body of the computer. For instance, the above-mentioned program medium may be also a tape type recording medium such as a magnetic tape and a cassette tape or the like. In addition, the above-mentioned program medium may be also a disc type recording medium such as a magnetic disc such as a flexible disc and a hard disc or the like and an optical disc such as CD-ROM (Compact Disc-Read Only Memory), MO (Magneto Optical), MD (Mini Disc) and DVD (Digital Versatile Disc) or the like. In addition, the above-mentioned program medium may be also a card type recording medium such as an IC (Integrated Circuit) card including a memory card and an optical card or the like. In addition, the above-mentioned program medium may be also a recording medium which includes a semiconductor memory such as mask ROM, EPROM (Erasable Programmable Read Only Memory), EEPROM (Electrically Erasable Programmable Read Only Memory) and flash ROM or the like and holds the program statically.

In addition, the above-mentioned program medium may be also a recording medium which holds a program under floating condition so that the program can be downloaded from communication network including the Internet.

As to the program which is stored in the recording medium and realizes the above-mentioned image processing method, the program is read by the program reading apparatus provided in the image forming apparatus and a computer system, and the program is run.

The computer system comprises an image input apparatus such as a flat bed scanner, a film scanner or a digital camera, a computer which performs image processing by loading a predetermined program, an image display apparatus, such as a cathode ray tube (abbreviated as "CRT") display apparatus or a liquid crystal display apparatus or the like, for displaying the result of computer processing thereon, and an image forming apparatus, such as a printer or the like, for outputting the result of computer processing. Furthermore, the computer system comprises communication means such as a modem for performing communication via a network.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing method comprising:
   a first process for, when a block image consisting of a plurality of pixels is defined as an objective image, calculating a parameter representing whether an effective density pixel having a predetermined density value exists in the objective image;
   a second process for, when one of pixels in the objective image is defined as an interest pixel and a pixel neighboring downstream side in a predetermined first direction with respect to the interest pixel is defined as a neighboring pixel, converting the objective image to an update image on lines from which one line is reduced in the first direction, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image;
   a third processing for calculating a parameter representing whether an effective density pixel exists in the update image; and
   a fourth processing for, when the second and third processes are repeated with respect to the update image defined as the objective image after the third process so that the objective image is lined on one line in the first direction, calculating a number of continuous pixels of the effective density pixels being spatially continuing in the block image on the basis of each parameter calculated in the first and the third processes.

2. The image processing method of claim 1, wherein the number of continuous pixels is calculated in the fourth process by adding each parameter calculated in the first and the third processes.

3. The image processing method of claim 1, wherein the number of continuous pixels is calculated in the fourth process by looking up a table showing relation between each parameter and the number of continuous pixels.

4. The image processing method of claim 1, further comprising:
   a fifth process for, when one of pixels in the objective image is defined as an interest pixel and a pixel neighboring downstream side in a second direction different from the first direction with the interest pixel is defined as a neighboring pixel, converting the objective image to an update image on lines from which one line is reduced in the second direction, by defining the interest pixel as the effective density pixel when a third condition on which the interest pixel is an effective density pixel and a fourth condition on which at least one neighboring pixel with respect to the interest pixel is an effective density pixel are satisfied, and by defining the interest pixel as an ineffective density pixel when either the third condition or the fourth condition is satisfied, as to each interest pixel having at least one neighboring pixel in the objective image;
   a sixth process for calculating a parameter representing whether an effective density pixel exists in the update image;
   a seventh process for, when the fifth and the sixth processes are repeated with respect to the update image defined as the objective image after the sixth process so that the objective image is lined on one line in the second direction, calculating the number of continuous pixels in the block image on the basis of each parameter calculated in the fifth and the sixth processes; and
   an eighth process for comparing the number of continuous pixels calculated in the fourth process with the number of continuous pixels calculated in the seventh process and calculating the number of continuous pixels having a larger value of them as the number of continuous pixels in the block image.

5. The image processing method of claim 4, wherein the number of continuous pixels is calculated in the seventh process by adding each parameter calculated in the fifth and the sixth processes.

6. The image processing method of claim 4, wherein the number of continuous pixels is calculated in the seventh process by looking up a table showing relation between each parameter and the number of continuous pixels.

7. A program for making the computer run the image processing method of claim 1.

8. A computer-readable recording medium on which the program of claim 7 is recorded.

9. An image processing apparatus comprising:
   a parameter calculating section for calculating a predetermined parameter representing whether an effective density pixel having a predetermined density value exists in an objective image which is a block image consisting of a plurality of pixels;
   an image converting section for performing image conversing processing for converting the objective image to an update image on lines from which one line is reduced in the detecting direction, when one of pixels in the objective image is defined as an interest pixel and a pixel neighboring downstream side in a predetermined first direction with respect to the interest pixel is defined as a neighboring pixel, by defining the interest pixel as the effective density pixel when a first condition on which the interest pixel is an effective density pixel and a second condition on which at least one neighboring pixel with respect to the interest pixel is an effective density pixel are satisfied, and by defining the interest pixel as an ineffective density pixel when either the first condition or the second condition is satisfied, as to each interest pixel having at least one neighboring pixel in the objective image, and for repeating the image converting processing until an objective image is lined on one line in the detecting direction after the update image is defined as the objective image again whenever the image converting processing is terminated; and a continuous-pixel-number calculating section for calculating the number of continuous pixels which represents the number of effective density pixel being spatially continuing in the block image on the basis of the parameter calculated by the parameter calculating section.

10. An image forming apparatus provided with the image processing apparatus of claim 9.

* * * * *